(12) United States Patent
Harakawa et al.

(10) Patent No.: US 6,234,768 B1
(45) Date of Patent: May 22, 2001

(54) SEALED-TYPE ELECTRIC COMPRESSOR HAVING REFRIGERANT PASSAGE

(75) Inventors: Yoshiaki Harakawa, Handa; Masami Sanuki, Chiryu; Yuichi Tsumagari, Toyokawa; Kenji Iriyama, Ogaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/449,733

(22) Filed: Nov. 26, 1999

(30) Foreign Application Priority Data

Dec. 14, 1998 (JP) .................................................. 10-354786

(51) Int. Cl.⁷ ..................................................... F04B 35/00
(52) U.S. Cl. .............................................................. 417/366
(58) Field of Search .................................... 417/366, 370, 417/371, 372, 373

(56) References Cited

U.S. PATENT DOCUMENTS 4,781,542 * 11/1988 Ozu et al. ............................ 417/369
5,222,874 * 6/1993 Unnewehr et al. .................. 417/372
6,155,802 * 12/2000 Choi et al. ........................... 417/366

FOREIGN PATENT DOCUMENTS 57-129287 8/1982 (JP) .

* cited by examiner

*Primary Examiner*—Teresa Walberg
*Assistant Examiner*—Vinod D Patel
(74) *Attorney, Agent, or Firm*—Pillsbury Winthrop LLP (57) ABSTRACT

Refrigerant passages in a compressor include an upper refrigerant passage and a lower refrigerant passage. The upper refrigerant passage is positioned above a datum line extending through a center of a rotor shaft of a compressor motor and perpendicularly to the rotor shaft, and the lower refrigerant passage is positioned below the datum line. A cross-sectional area of the upper refrigerant passage is larger than that of the lower refrigerant passage. Thus, even when lubricating-oil blocks the lower refrigerant passage, the refrigerant flows through the upper refrigerant passage, thereby reducing the pressure loss of the refrigerant, and preventing the lubricating oil from being caught in the refrigerant and discharged with the refrigerant from the compressor.

10 Claims, 6 Drawing Sheets

SEALED-TYPE ELECTRIC COMPRESSOR HAVING REFRIGERANT PASSAGE

CROSS REFERENCE TO RELATED APPLICATION

This application is based on and incorporates herein by reference Japanese Patent Application No. Hei. 10-354786 filed on Dec. 14, 1998.

BACKGROUND OF THE INVENTION

1. Field of the Invention

The present invention relates to a sealed-type electric compressor having an electric motor and a compression mechanism within a compressor housing, suitable for use in a refrigerating cycle of an automotive air conditioning system.

2. Description of Related Art

Recently, a hybrid vehicle driven by a combustion engine and an electric motor, and an electric vehicle driven by an electric motor has been developed for reducing exhaust emissions. In accordance with the development of these vehicles, a sealed-type electric compressor driven by an electric motor has also been developed for an air conditioning system of these vehicles.

The electric compressor is installed in a vehicle engine compartment such that the rotor shaft thereof is horizontally arranged for lowering the height of hood to increase visibility.

In the electric compressor, refrigerant discharged from a compression mechanism flows through a motor chamber, where the electric motor is installed, to cool the motor, then is discharged from a compressor housing. However, when the refrigerant simply flows through the motor chamber, pressure-loss of the refrigerant increases. Thus, in general, a refrigerant passage is provided between the housing and a stator of the electric motor for guiding the refrigerant.

However, since the electric motor is installed such that the rotor shaft thereof is horizontally positioned, lubricating-oil lubricating sliding portions of the compressor is stored on the bottom of the motor chamber. The lubricating-oil stored in the motor chamber blocks the refrigerant passage formed at the lower portion of the compressor.

Thus, the cross-sectional area of the refrigerant passage is substantially reduced, so that the pressure loss of the refrigerant increases in the motor chamber. Further, the lubricating-oil stored on the motor chamber bottom is caught in the refrigerant, and is discharged with the refrigerant from the compressor.

In such a situation, when a predetermined amount of the lubricating-oil flows out of the compressor, the sliding portions are not sufficiently lubricated and the heat exchanging efficiencies of a condenser and a an evaporator are reduced.

SUMMARY OF THE INVENTION

An object of the present invention is to suppress a pressure loss of the refrigerant in the motor chamber, and to prevent the lubricating-oil from being discharged with the refrigerant, even when the electric compressor is installed such that the rotor shaft is horizontally positioned.

According to a first aspect of the present invention, fluid (refrigerant) passages of the compressor include an upper fluid passage and a lower fluid passage. The upper fluid passage is positioned at one side with respect to a datum line extending through a center of the rotor shaft and perpendicularly to the rotor shaft, and the lower fluid passage is positioned on the other side of the datum line. A cross-sectional area of the upper fluid passage is larger than a cross-sectional area of the lower fluid passage.

When the electric compressor is installed such that the datum line is substantially horizontally positioned, the upper fluid passage having the larger cross-sectional area is located above an oil surface of the lubricating-oil stored in the motor chamber, and the lower fluid passage having the smaller cross-sectional area is located under the oil surface.

Thus, even when the electric compressor is installed such that the rotor shaft is horizontally positioned and the lubricating-oil blocks the lower fluid passage, the fluid discharged from the compression mechanism to the motor chamber flows through the upper fluid passage, thereby reducing the pressure loss of the fluid.

Further, most of the fluid discharged from the compression mechanism to the motor chamber flows through the upper fluid passage, so that the lubricating-oil stored in the motor chamber is not caught in the fluid, and is not discharged with the fluid from the compressor.

According to a second aspect of the present invention, an upper fluid passage is positioned above an oil surface of the lubricating-oil stored in the motor chamber, and a lower fluid passage is positioned under the oil surface. A cross-sectional area of the upper fluid passage is larger than a cross-sectional area of the lower fluid passage.

Thus, as in the first aspect of the present invention, even when the electric compressor is installed such that the rotor shaft is horizontally positioned, the pressure-loss of the fluid in the motor chamber is reduced and the lubricating-oil is prevented from being discharged with the fluid from the compressor.

According to a third aspect of the present invention, a fluid passage is formed at only one side with respect to a datum line extending through a center of said rotor shaft and perpendicularly to said rotor shaft.

Thus, as in the first aspect of the present invention, even when the electric compressor is installed such that the rotor shaft is horizontally positioned, the pressure loss of the fluid in the motor chamber is reduced and the lubricating-oil is prevented from being discharged with the fluid from the compressor.

According to a fourth aspect of the present invention, the fluid passage is formed only above an oil surface of lubricating-oil stored in the chamber.

Thus, as in the first aspect of the present invention, even when the electric compressor is installed such that the rotor shaft is horizontally positioned, the pressure loss of the fluid in the motor chamber is reduced and the lubricating-oil is prevented from being discharged with the fluid from the compressor.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a cross-sectional view taken along line III—III in

FIG. 2 (first embodiment);

DETAILED DESCRIPTION OF PREFERRED EMBODIMENTS (First Embodiment)

Figure 1:
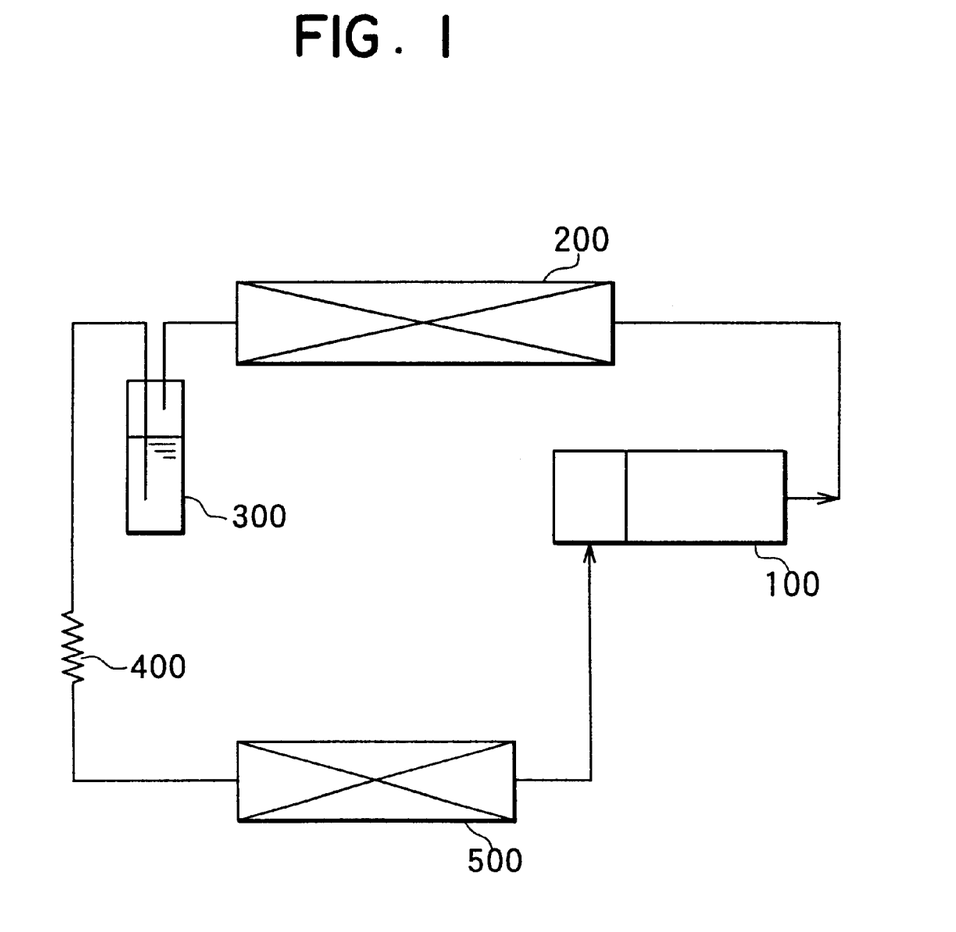
FIG. 1 is a schematic view of a refrigerating cycle.

In the first embodiment, an electric compressor 100 is applied to a refrigerating cycle of an automotive air conditioning system. FIG. 1 schematically shows the refrigerating cycle.

The compressor 100 suctions a refrigerant and compresses the refrigerant. A condenser 200 radiates the heat of the refrigerant discharged from the compressor 100. In the condenser 200, the refrigerant heat is exchanged with an exterior air. A receiver 300 divides the refrigerant flowing from the condenser 200 into a gas phase refrigerant and a liquid phase refrigerant, and discharges the liquid phase refrigerant. The receiver 300 also stores surplus refrigerant in the refrigerating cycle. A capillary tube 400 reduces the pressure of the liquid phase refrigerant flowing from the receiver 300, and converts the liquid phase refrigerant into a gas-liquid phase refrigerant. An evaporator 500 evaporates the liquefied refrigerant of the gasliquid phase refrigerant, and cools air flowing through the evaporator 500.

Figure 2:
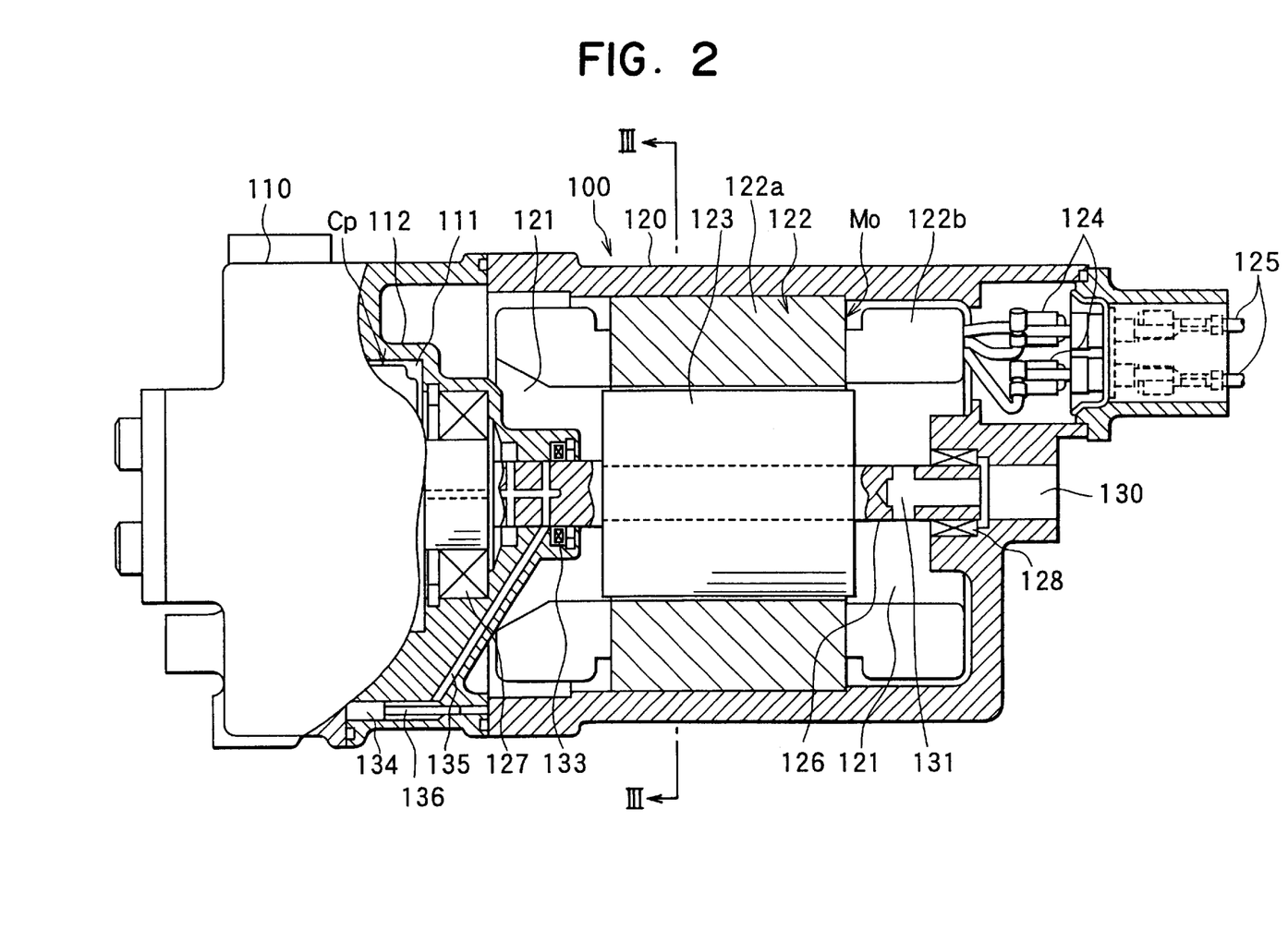
FIG. 2 is a cross-sectional view of a compressor (first embodiment)

FIG. 2 shows an axial cross-sectional view of the electric compressor 100. This compressor 100 is a sealed type compressor including a scroll compression mechanism Cp and an electric motor Mo (in this embodiment, a DC brush less motor) within an aluminum compressor housing 110. The compressor housing 110 includes a fixed scroll member of the scroll compression mechanism Cp. The scroll compression mechanism Cp suctions and compresses the refrigerant, and the electric motor Mo drives the compression mechanism Cp.

A middle housing 112 is fixed to the compressor housing 110 by bolts (not illustrated). The middle housing 112 partitions a suction chamber 111 of the compression mechanism Cp from a motor chamber 121 where the electric motor Mo is installed.

An aluminum motor housing 120 forms the motor chamber 121, and the motor chamber 121 communicates with a discharge side of the compression mechanism Cp.

The electric motor Mo includes a stator coil 122 and a magnet rotor 123. The stator coil 122 includes a cylindrical yoke 122a, and a coil 122b wound around and installed in a slot 122c (see FIG. 3) of the yoke 122a. The yoke 122a is made of a magnetic material, such as silicon steel, and is shrink-fitted to the motor housing 120.

A lead 124 is connected to the end of the coil 122b for supplying electric current to the stator coil 122, and a terminal 125 connects the lead 124 to an outside electric circuit (not illustrated). The terminal 125 is molded on the compressor housing 110 with resin.

The magnet rotor 123 rotates inside the stator coil 122. The rotor 123 includes a shaft 126. A front end of the shaft 126 penetrates through the middle housing 112, is connected to a movable scroll of the compression mechanism Cp, and is rotatably supported in the middle housing 112 with a radial bearing 127. A rear end of the shaft 126 is rotatably supported in the motor housing 120 with a radial bearing 128. The electric compressor 100 is installed in a vehicle engine compartment such that the shaft 126 is horizontally positioned.

A discharge port 130 is formed at the rear end of the motor housing 120, and the refrigerant, flowing from the compression mechanism Cp into the motor chamber 121, is discharged to the condenser 200 through the discharge port 130. A first refrigerant passage 131 is formed within the shaft 126. The first refrigerant passage 131 has an opening facing the discharge port 130, for leading the refrigerant from the motor chamber 121 to the discharge port 131.

Figure 3:
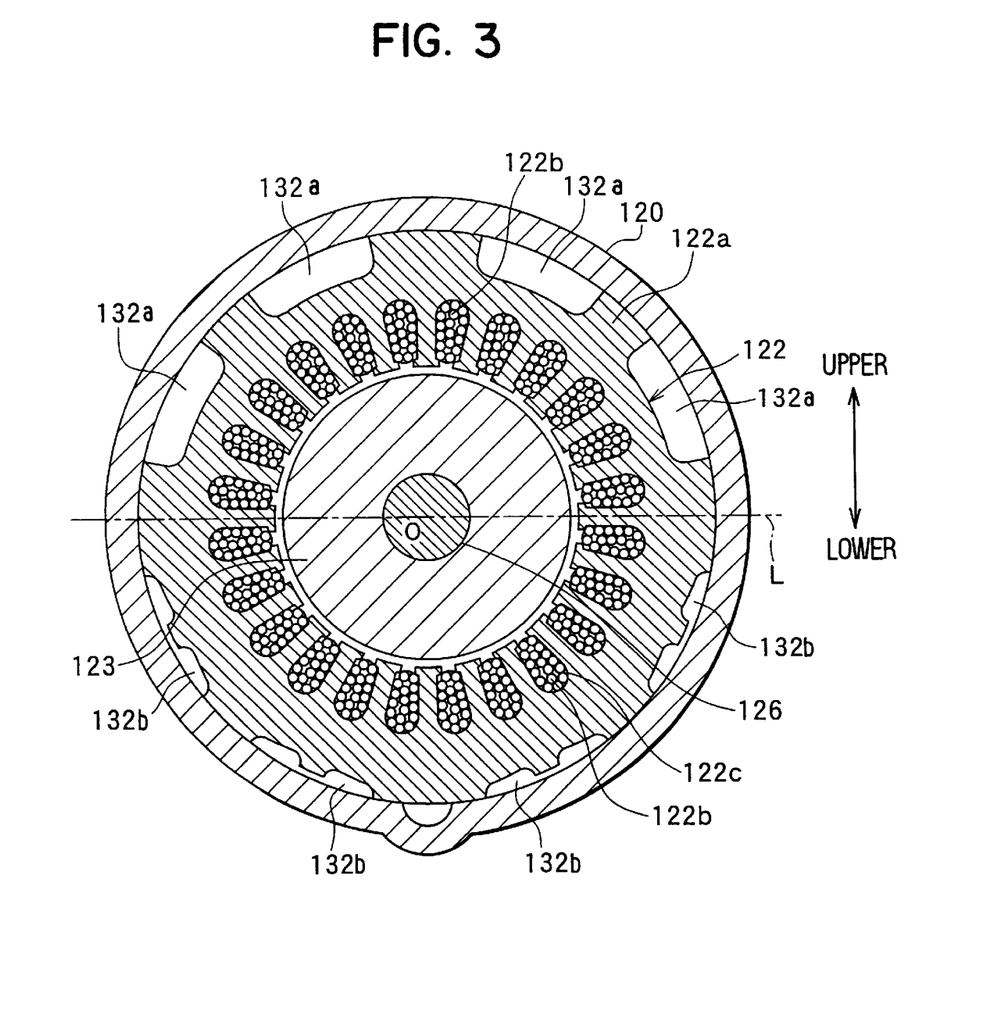

As shown in FIG. 3, a plurality of second refrigerant passages 132a and 132b are formed between the stator coil 122 (yoke 122a) and the motor housing 120. The second refrigerant passages 132a and 132b are formed by notching an outer periphery of the yoke 122a. These second refrigerant passages 132a, 132b include upper second refrigerant passages 132a and lower second refrigerant passages 132b. The second refrigerant passages 132a, 132b also lead the refrigerant, discharged from the compression mechanism Cp into the motor chamber 121, to the discharge port 130. These second refrigerant passages 132a, 132b extend substantially in parallel with the longitudinal direction of the shaft 126.

As shown in FIG. 3, the upper second refrigerant passages 132a are positioned above a datum line L, and the lower second refrigerant passages 132b are positioned below the datum line L. The datum line L extends through the center line O of the shaft 126 and extends perpendicularly to the center line of the shaft 126. The cross-sectional area of the upper refrigerant passages 132a is set larger than that of the lower refrigerant passages 132b.

As shown in FIG. 2, a lip seal 133 is provided at the rear end of the middle housing 112. The lip seal 133 is made of resin, and slidably contacts the shaft 126 for sealing a gap between the middle housing 112 and the shaft 126 to prevent the refrigerant in the motor chamber 121 from leaking to the suction chamber 111.

A main lubricating-oil passage 134 is formed at the bottom of the middle housing 112 and the motor housing 120 for guiding the lubricating-oil stored in the motor chamber 121 to the suction chamber 111. A sub lubricating-oil passage 135 is formed in the middle housing 112 for guiding the lubricating-oil from the main lubricating-oil passage 134 to the radial bearing 127 and the lip seal 133. A cylindrical restrictor 136 is provided in the main lubricating-oil passage 134 for adjusting an amount of oil flowing through the main lubricating-oil passage 134.

According to the first embodiment, the cross-sectional area of the upper second refrigerant passages 132a, which are positioned above the datum line L, is larger than that of the lower second refrigerant passages 132b, which are positioned below the datum line L. Thus, when the electric compressor 100 is installed in a vehicle such that the datum line L is placed horizontally, the cross-sectional area of the upper second refrigerant passages 132a, which are positioned above the oil surface of the lubricating-oil stored in the motor chamber 121, is larger than that of the lower second refrigerant passages 132b, which are positioned under the oil surface.

Accordingly, even when the electric compressor 100 is installed in the vehicle such that the shaft 126 is positioned horizontally and the lower second refrigerant passage 132b is blocked by the lubricating-oil, the refrigerant discharged from the compression mechanism Cp into the motor chamber 121 flows through the upper second refrigerant passages 132a having the larger cross-sectional area and reaches the discharge port 130, thereby reducing the pressure loss of the refrigerant in the motor chamber 121.

Further, most of the refrigerant discharged from the compression chamber Cp into the motor chamber 121 flows through the upper second refrigerant passages 132a and reaches the discharge port 130. Thus, the lubricating-oil stored on the bottom of the motor chamber 121 is prevented from being caught in the refrigerant and being discharged from the compressor 100 with the refrigerant.

(Second Embodiment)

Figure 4:
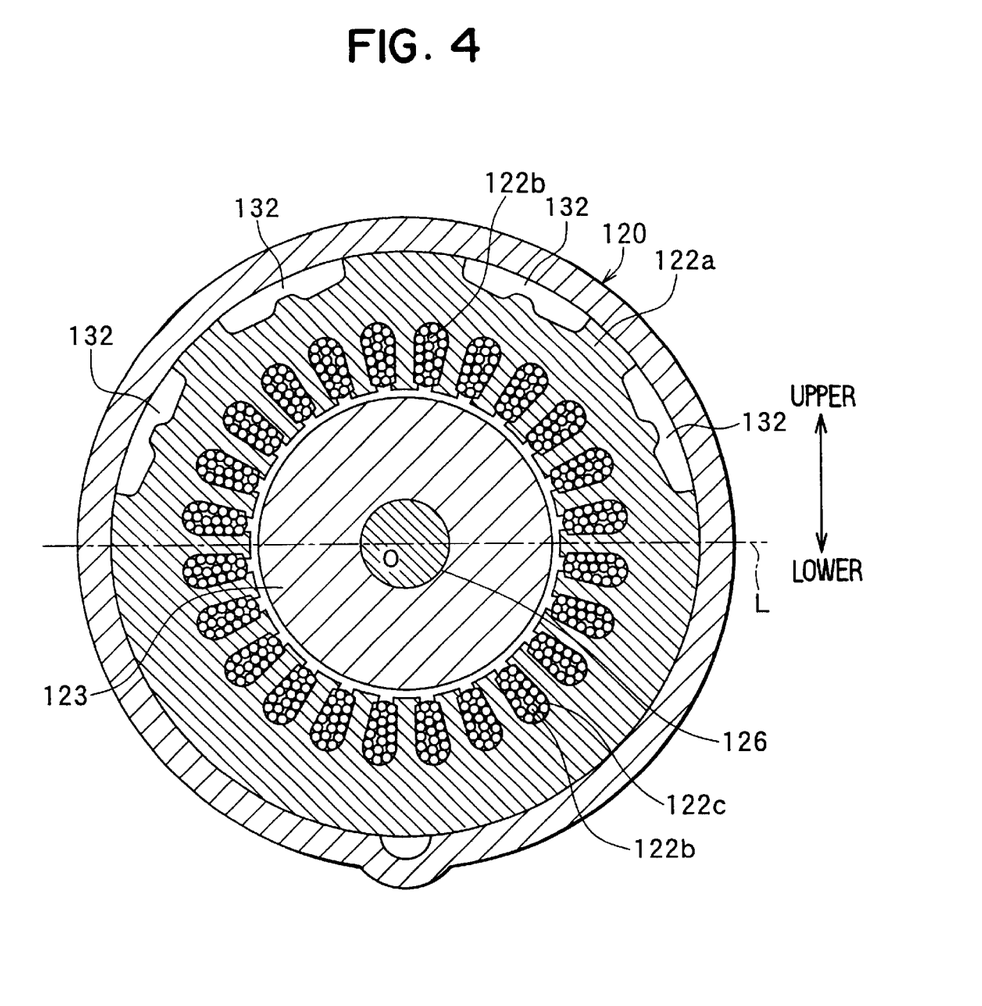
FIG. 4 is a cross-sectional view of a compressor showing a principal portion of the refrigerant passages (second embodiment)

According to the second embodiment, as shown in FIG. 4, all of the second refrigerant passages 132 are formed only above the datum line L.

Thus, when the electric compressor 100 is installed in a vehicle such that the datum line L is placed horizontally, and the electric compressor 100 is installed in the vehicle such that the shaft 126 is positioned horizontally, as in the first embodiment, the pressure loss of the refrigerant is reduced and the lubricating-oil is not discharged from the compressor 100 with the refrigerant.

(Third Embodiment)

Figure 5:
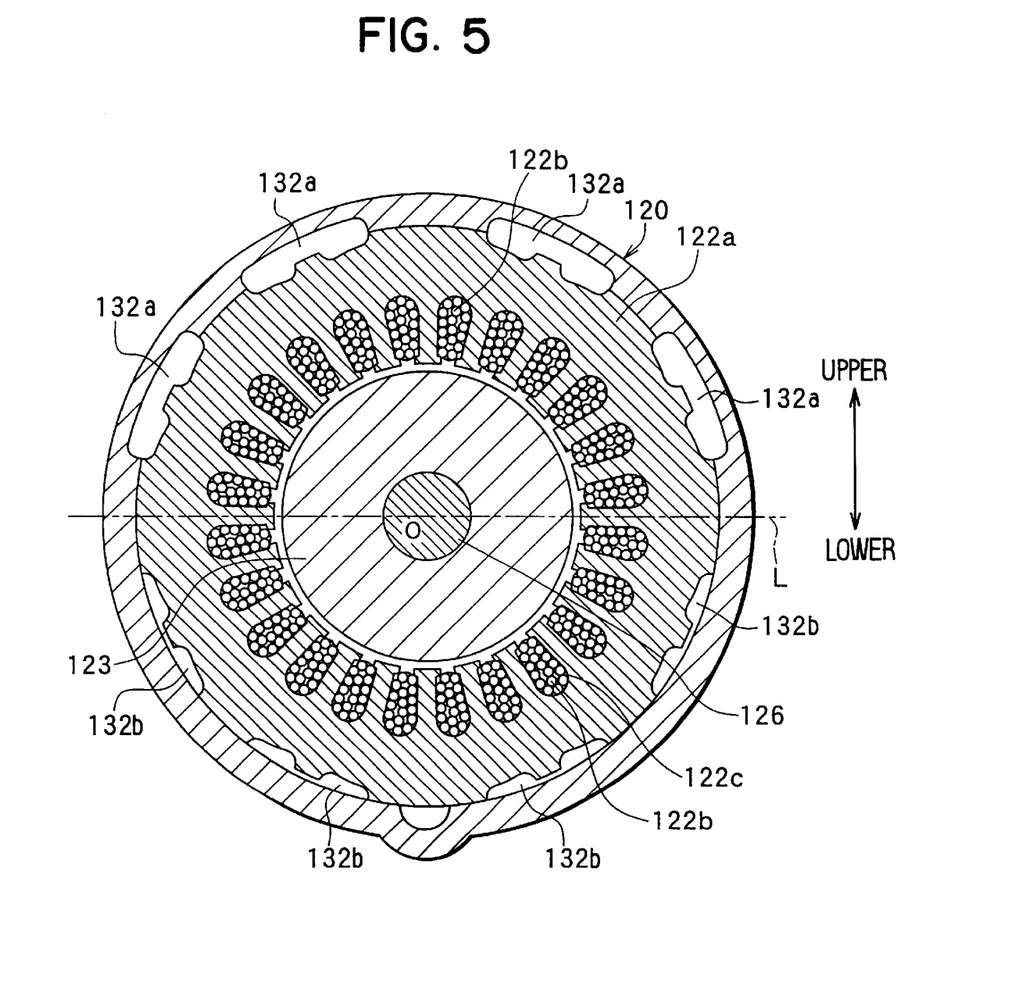
FIG. 5 is a cross-sectional view of a compressor showing a principal portion of the refrigerant passages (third embodiment)
Figure 6:
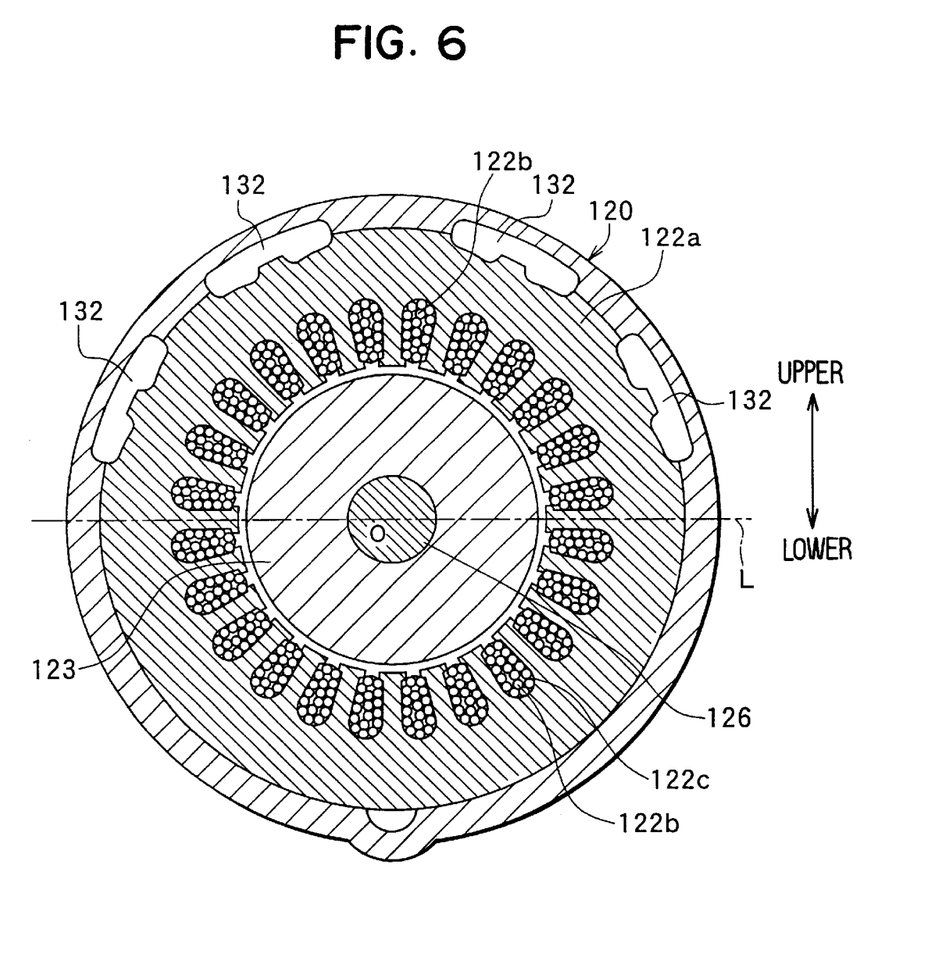
FIG. 6 is a cross-sectional view of a compressor showing a principal portion of the refrigerant passages (alternative third embodiment).

In the above-described embodiments, the second refrigerant passages 132 are formed by notching the outer periphery of the yoke 122a. However, according to the third embodiment, as shown in FIGS. 5 and 6, the second refrigerant passages 132 are formed by also notching the inner periphery of the motor housing 120.

(Modifications)

In the above-described embodiments, the present invention is applied to a scroll compressor. The present invention is not restricted to a scroll compressor and alternatively, may be applied to other type compressors, such as a vane compressor, rolling piston compressor, and the like.

In the above-described embodiments, the electric motor Mo is a DC brush less motor. The present invention is not restricted to this and the electric motor Mo may alternatively be an induction motor, and the like.

In the above-described embodiments, the compressor 100 is installed in the vehicle such that the datum line L is horizontally positioned. However, it is important for the present invention that the upper second refrigerant passages 132a positioned above the oil surface have a larger cross-sectional area than the lower second refrigerant passages 132b positioned under the oil surface. Thus, the datum line L may be slightly inclined with respect to horizontal. Further, the present invention efficiently operates when the shaft 126 is substantially horizontally. Thus, the present invention is not restricted to an automotive air conditioning system, and may alternatively be applied to a built-in type refrigerating system, and the like, where the compressor shaft 126 is substantially horizontally.

What is claimed is:

1. An electric compressor to compress fluid comprising:
   a housing forming an outer casing;
   a compression mechanism provided in said housing for suctioning and compressing the fluid;
   an electric motor driving said compression mechanism, said electric motor including a stator, a rotor rotating inside said stator, and a rotor shaft;
   a motor chamber provided in said housing, where said electric motor is installed; and
   fluid passages provided in said housing for guiding the fluid discharged from said compression mechanism, wherein
   said fluid passages extend substantially in parallel with said rotor shaft,
   said fluid passages include an upper fluid passage positioned on one of a datum line extending through a center of said rotor shaft and perpendicularly to said rotor shaft, and a lower fluid passage positioned on an other side of the datum line, and
   a cross-sectional area of said upper fluid passage is larger than a cross-sectional area of said lower fluid passage.

2. An electric compressor according to claim 1, wherein said electric compressor is used in an automotive air conditioning system, and
said electric compressor is installed in a vehicle such that said rotor shaft is substantially horizontally positioned.

3. An electric compressor according to claim 1, wherein said fluid passages are formed by notching an outer periphery of said stator.

4. An electric compressor according to claim 1, wherein said fluid passages are formed by notching an inner periphery of said housing.

5. An electric compressor to compress fluid comprising:
   a housing forming an outer casing;
   a compression mechanism provided in said housing for suctioning and compressing the fluid;
   an electric motor driving said compression mechanism, said electric motor including a stator, a rotor rotating inside said stator, and a rotor shaft;
   a motor chamber provided in said housing, where said electric motor is installed; and
   fluid passages provided in said housing for guiding the fluid discharged from said compression mechanism, wherein
   said fluid passages extend substantially in parallel with said rotor shaft,
   said fluid passages include an upper fluid passage positioned above an oil surface of lubricating-oil stored in said motor chamber, and a lower fluid passage positioned below the oil surface, and
   a cross-sectional area of said upper fluid passage is larger than a cross-sectional area of said lower fluid passage.

6. An electric compressor according to claim 5, wherein said electric compressor is used in an automotive air conditioning system, and
said electric compressor is installed in a vehicle such that said rotor shaft is substantially horizontally positioned.

7. An electric compressor to compress fluid comprising:
   a housing forming an outer casing;
   a compression mechanism provided in said housing for suctioning and compressing the fluid;
   an electric motor driving said compression mechanism, said electric motor including a stator, a rotor rotating inside said stator, and a rotor shaft;
   a motor chamber provided in said housing, where said electric motor is installed; and
   a fluid passage provided in said housing for guiding the fluid discharged from said compression mechanism, wherein
   said fluid passage extends substantially in parallel with said rotor shaft, and
   said fluid passage is formed on only one side of a datum line extending through a center of said rotor shaft and perpendicularly to said rotor shaft.

8. An electric compressor according to claim 7, wherein said electric compressor is used in an automotive air conditioning system, and
said electric compressor is installed in a vehicle such that said rotor shaft is substantially horizontally positioned.

9. An electric compressor to compress fluid, comprising:

a housing forming an outer casing;

a compression mechanism provided in said housing for suctioning and compressing the fluid;

an electric motor driving said compression mechanism, said electric motor including a stator, a rotor rotating inside said stator, and a rotor shaft;

a motor chamber provided in said housing, where said electric motor is installed; and a fluid passage provided in said housing for guiding the fluid discharged from said compression mechanism, wherein said fluid passage extends substantially in parallel with said rotor shaft, said fluid passage is formed only above an oil surface of lubricating-oil stored in said motor chamber.

10. An electric compressor according to claim 9, wherein said electric compressor is used in an automotive air conditioning system, and said electric compressor is installed in a vehicle such that said rotor shaft is substantially horizontally positioned.

* * * * *